(12) United States Patent
Ogle

(10) Patent No.: US 7,661,102 B2
(45) Date of Patent: Feb. 9, 2010

(54) METHOD FOR REDUCING BINARY IMAGE UPDATE PACKAGE SIZES

(75) Inventor: Andrew J. Ogle, Amersham (GB)

(73) Assignee: Smith Micro Software, Inc., Aliso Viejo, CA (US)

( * ) Notice: Subject to any disclaimer, the term of this patent is extended or adjusted under 35 U.S.C. 154(b) by 791 days.

(21) Appl. No.: 10/922,718

(22) Filed: Aug. 20, 2004

(65) Prior Publication Data

US 2006/0039618 A1  Feb. 23, 2006

(51) Int. Cl.
G06F 9/44 (2006.01)

(52) U.S. Cl. ..................................... 717/168
(58) Field of Classification Search ................ 717/136, 717/140, 158–159, 168–178
See application file for complete search history.

(56) References Cited

U.S. PATENT DOCUMENTS

| | | | | |
|---|---|---|---|---|
| 5,842,017 | A * | 11/1998 | Hookway et al. | 717/158 |
| 5,930,509 | A * | 7/1999 | Yates et al. | 717/159 |
| 6,502,237 | B1 * | 12/2002 | Yates et al. | 717/136 |
| 6,542,906 | B2 * | 4/2003 | Korn | 707/203 |
| 6,546,552 | B1 * | 4/2003 | Peleg | 717/170 |
| 6,775,423 | B2 * | 8/2004 | Kulkarni et al. | 382/305 |
| 6,832,373 | B2 * | 12/2004 | O'Neill | 717/171 |
| 7,031,972 | B2 * | 4/2006 | Ren et al. | 707/101 |
| 7,210,010 | B2 * | 4/2007 | Ogle | 711/162 |
| 7,313,791 | B1 * | 12/2007 | Chen et al. | 717/170 |
| 7,367,027 | B1 * | 4/2008 | Chen et al. | 717/168 |
| 7,409,685 | B2 * | 8/2008 | Chen et al. | 717/170 |
| 7,430,670 | B1 * | 9/2008 | Horning et al. | 713/190 |
| 7,478,381 | B2 * | 1/2009 | Roberts et al. | 717/168 |
| 7,509,636 | B2 * | 3/2009 | McGuire et al. | 717/168 |
| 7,555,750 | B1 * | 6/2009 | Lilley | 717/168 |
| 2004/0062130 | A1 * | 4/2004 | Chiang | 365/230.03 |
| 2004/0088473 | A1 * | 5/2004 | Ogle | 711/100 |
| 2004/0194081 | A1 * | 9/2004 | Qumei et al. | 717/173 |
| 2004/0215755 | A1 * | 10/2004 | O'Neill | 709/223 |
| 2004/0267833 | A1 * | 12/2004 | Meller et al. | 707/200 |
| 2005/0027758 | A1 * | 2/2005 | Meller et al. | 707/204 |
| 2005/0102660 | A1 * | 5/2005 | Chen et al. | 717/168 |
| 2005/0132356 | A1 * | 6/2005 | Cross et al. | 717/174 |
| 2005/0160418 | A1 * | 7/2005 | Jeong et al. | 717/173 |
| 2005/0204348 | A1 * | 9/2005 | Horning et al. | 717/140 |
| 2006/0258344 | A1 * | 11/2006 | Chen | 455/419 |
| 2007/0028226 | A1 * | 2/2007 | Chen et al. | 717/168 |
| 2007/0079306 | A1 * | 4/2007 | Qumei | 717/168 |

* cited by examiner

*Primary Examiner*—Wei Y Zhen
*Assistant Examiner*—Qing Chen
(74) *Attorney, Agent, or Firm*—Smyrski Law Group, A P.C.

(57) ABSTRACT

A system and method for reducing the update package size used to convert an original image into a new image based on the differences between the two images. From comparison of original and new images, an update package is generated which includes ADD and COPY operations. This design introduces a RELOCATE operation. The update encoder attempts to re-express submitted COPY operations with one or more RELOCATE operations whose total length exceeds that of the original COPY. If this is the case, the RELOCATE operation(s) have progressed further through the images than the original COPY operation, thus producing a smaller update package. Each individual RELOCATE operation includes a number of instructions and a number of data items to be relocated.

14 Claims, 7 Drawing Sheets

METHOD FOR REDUCING BINARY IMAGE UPDATE PACKAGE SIZES

FIELD OF THE INVENTION

The present invention relates generally to the field of computer systems, and more specifically to systems and methods for updating a data image stored in a non-volatile memory device, such as a flash memory. In particular, but not exclusively, the present invention pertains to generating and applying an update package to convert an original first binary image into a new second binary image where the update package is an efficient set of instructions based on the differences between the two images.

BACKGROUND OF THE INVENTION

Recent years have seen the rapid advancement and proliferation of electronic devices, which devices often require the updating of the resident firmware, operating code, applications or other software loaded thereon, collectively, "binary images", or simply "images". Moreover, installing and updating of such binary images is becoming more routine as advancements applicable to a particular device far outpace the rate at which it is desirable to retire the unit and replace it with an entirely new unit.

Moreover, for many devices for which updating the binary image is desirable, these same devices may be remotely located and it is not practical for many reasons to return or collect the device in order that it can be directly connected to a host updating machine or system.

Additionally, with limited memory on the device itself, whether it is a mobile phone, PDA, pager or any other variety of small form factor portable device, delivery of an entire new image is often infeasible due to the capacity limitations of the device. Also, even if the device is not memory or other resource constrained, and thus not limiting the size or application process for installing an update, delivery of a complete new image may still be infeasible because the connection used by the device may be intermittent and/or of a limited capacity.

Accordingly there is a need for an efficient, effective and reliable system and method for providing an update to a device that does not require the unit to be returned to a service center for update and instead uses an update package that can modify the binary image in-situ, and is significantly smaller than the full image.

A known manner in reducing the size of a new image update is to use a differencing algorithm or Binary Differencing Engine (BDE) to compare the original or existing binary image with the new binary image to produce a list of differences, herein referred to as an 'update package'. Such differences, in a general sense, are typically output or expressed as sequences or sets of ADD and COPY operations such that the new image can be created by combining together binary sequences copied from the original image resident on the device (a COPY operation) and interlacing them with binary sequences from the new image (contained within the update package) for which a suitable copy sequence was not available in the original image (an ADD operation). The ADD operation specifies a list of bytes that must be copied from the update package into the new image at the current location, and the COPY operation specifies a number of bytes to be copied from a given location in the original image to the current update location in the new image.

ADD or COPY operations identified by the BDE, or candidate operations where more than one is possible at a given location within the image, are supplied to an Update Encoder which is responsible for selecting preferred candidate operations, possibly combining additional available encoding information, and for ultimately producing the final binary update package. This process may involve finding the smallest encoding for each of the required operations together with a final compression phase. One efficient approach to generating update packages is described in U.S. patent application Ser. No. 10/676,483 entitled "Efficient System and Method for Updating a Memory Device", filed Sep. 30, 2003, the disclosure of which is incorporated herein by reference.

One implication of modifying an original image to create a new image (whether to add new functionality, fix errors or otherwise) is that even small changes to the original image may cause large portions of the image to move in the microprocessor's address space. This effect can cause even logically small changes to create large numbers of alterations in addressing and reference pointers. Thus, though large portions of the original image may only have been moved, the BDE in general may not be able to generate a set of simple COPY operations because of how the embedded transfers of control (e.g. branch or jump instructions) are expressed within the processor's instruction set. The BDE will typically find a very large number of small changes to the image interspersed with short sections of unmodified or purely moved content. Even though the functional change to the image was minor, the resultant detailed changes to the image require the BDE to generate a large number of small modifications (i.e. ADD) to the image interspersed with short sections of purely copied content (i.e. COPY) in order to resolve and reflect the new location for transfers of control. This can result in large update packages even where the functional change to the image was small.

Accordingly, a system or method that can effectively accommodate these changes to control transfers and addressing issues, thereby reducing the size of the resultant update packages would be desirable. More directly, what is needed is an approach to recognize large portions of the original image being moved in the processor's address space. The ability to efficiently express the effect of moving this code/data structure through the address space is key to reducing the update package size.

The need therefore is for a system that reduces the size impact of systematic image changes on the final update package by optimizing the size and number of operations to produce the smallest update package for any given original image and new image. The resulting update package size thus reflects the size of the functional change made to the image rather than its impact at the raw binary level.

SUMMARY OF THE INVENTION

The present invention has as an object to reduce the size impact on an update package of functional changes and error fixes to a binary image thus allowing efficient over-the-air (OTA) delivery of the update package to a client device and storage therein.

A typical embodiment of this invention that would benefit from the reduction achieved in update package sizes would be any application using binary differencing techniques to store multiple images for microprocessor instructions and data by use of an original image and update packages.

The present invention comprises a modification to the Update Encoder to support an additional low-level "RELOCATE" operation, that is, in addition to the basic ADD and COPY operations. Such RELOCATE functionality has two principle components, (1) the operation itself, and (2) a single Address Translation Table (ATT). The ATT is both created and used as the update package is encoded, and also used when applying the update package for the purpose of decoding all RELOCATE operations comprised therein.

In essence, when the modified Update Encoder receives a COPY operation submitted from the BDE, prior to encoding, it attempts to re-express this operation with one or more RELOCATE operations whose total length exceeds that of the original COPY. If this is possible, the encoder encodes the RELOCATE operation(s), and returns to the BDE with a status indicating that it has progressed further through the images than the original COPY operation would have, so that the BDE can take this into account when finding the next ADD or COPY operation. Each individual RELOCATE operation includes a number of instructions and a number of data items to be relocated. The block of instructions and block of data so described form a single contiguous region of the image, within which all the instructions appear first, followed by the data items.

To decode and apply an update package, the decoder retrieves each operation, in the order provided, from the update package. If the decoder encounters an ADD or COPY operation, it will process these operations consistent with the method described in U.S. patent application Ser. No. 10/676, 483 entitled "Efficient System and Method for Updating a Memory Device", filed Sep. 30, 2003. The process required to decode an individual RELOCATE operation from an update package and apply the required changes to convert a fragment of the original image into the corresponding new fragment is shown in FIGS. 3A and 3B. If the decoder encounters a RELOCATE operation, it first copies instructions from the original image to the new image and relocates all destinations of control transfers found within those copied instructions according to the address/delta information provided within the ATT. Next, the decoder copies data from the original image to the new image and relocates each data item according to the address/delta information provided within the ATT.

The present invention, as described, relates to images prepared for a Reduced Instruction Set Computer/Compiler (RISC) Central Processing Unit (CPU), and in particular a 32-bit RISC CPU using a 16-bit instruction set. Common examples being an Advanced RISC Machine (ARM) Ltd. CPU in Thumb mode (i.e. a subset of the most commonly used 32-bit ARM instructions compressed into 16-bit wide op-codes), or a Motorola M-CORE CPU. The present invention can be easily adapted to any RISC CPU. The present invention is described specific to the 16/32-bit CPU style of architecture.

A typical embodiment of this invention would be for updating of the flash memory image in a mobile phone where the update package has been delivered to the phone over-the-air (OTA) and is being applied to the flash memory without the subscriber returning the phone to a service center for update.

Thus, a further and more specific object of the invention is a substantially reduced size of a update package acceptable for OTA delivery, particularly when it would be impractical for a complete copy of the new image to be delivered due to constraints in the communications network utilized or it would also be infeasible due to memory or other performance constraints on the target device. Accordingly, yet a further object of the invention is a space efficient storage of an update package expressing the difference between an original binary image and an updated version of that image. These small update packages may feasibly be transmitted over low speed communications links (e.g. a GSM network), and stored on devices with limited available memory (e.g. a mobile phone).

As will be evident through further understanding of the invention, any application using binary differencing techniques to store multiple images by use of an original and update packages (rather than simply the raw images themselves) would potentially benefit from reduced storage requirements. This method of generating update packages could be applied to any device using conventional non-volatile memory such as flash memory; i.e., those with limited additional memory for storage of new images prior to update would benefit by requiring only the space for the much smaller update package to be held instead.

BRIEF DESCRIPTIONS OF THE DRAWINGS

DETAILED DESCRIPTION OF THE INVENTION

Figure 1A:
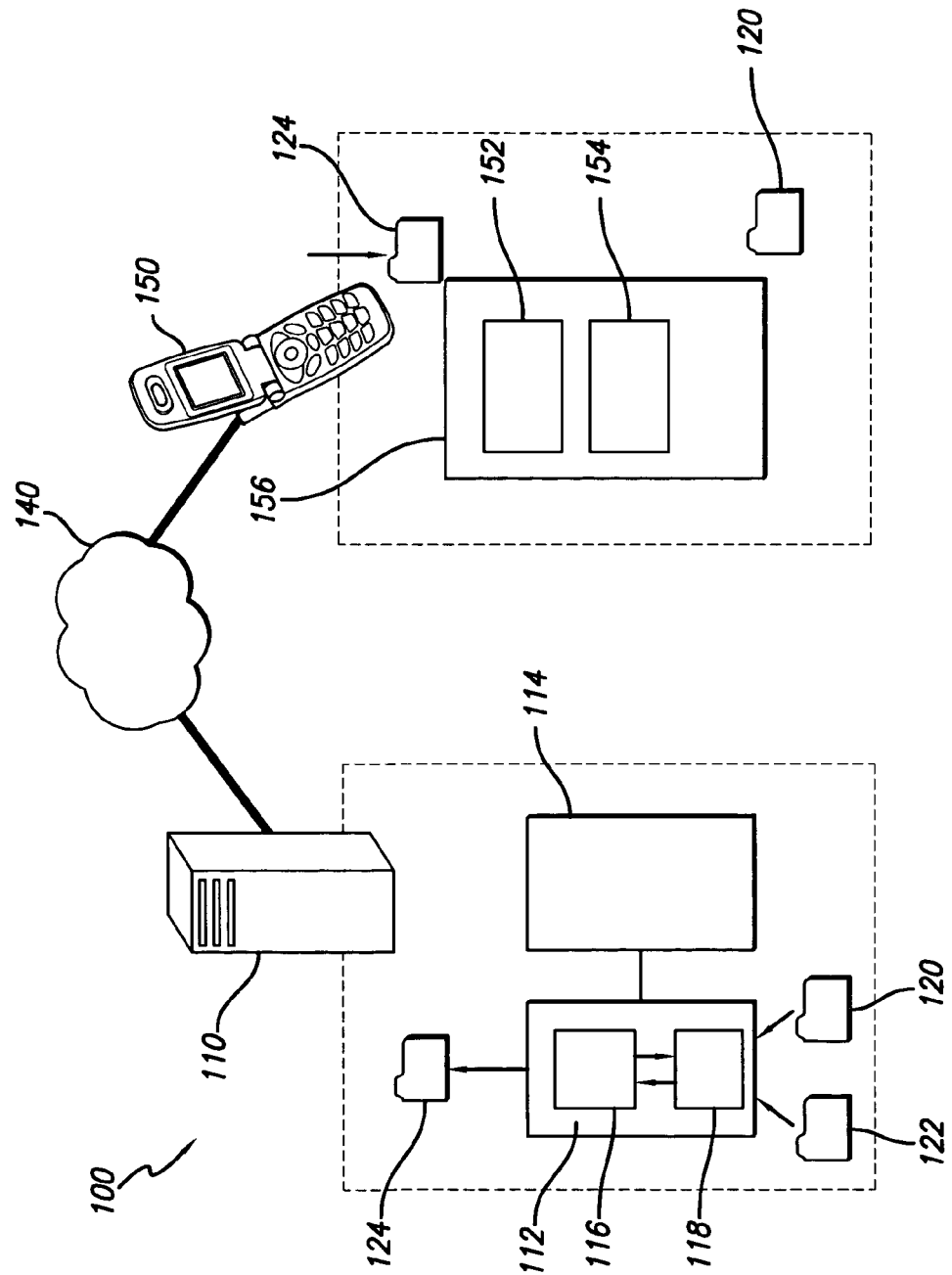
FIG. 1A is a schematic illustration of an updating system of the present invention.

The present invention will now be described in relation to a general updating system as illustrated in FIG. 1A, showing an update server and client device involved in the updating of an original image residing on the client device. Generally, the present invention introduces an enhanced operation to the low-level encoder and low-level decoder of the existing art. The encoder and decoder are thus modified to support an operation referred to as "RELOCATE". This use and support of the RELOCATE operation is comprised of two components (1) the operation itself, and (2) an Address Translation Table (ATT). By way of explanation and without limitation, the term "RELOCATE" is a nominal term used by the inventor hereof, and the functional steps and effect of the present invention may be implemented using any number of other terms or operation naming conventions.

FIG. 1A shows an update system 100 in accordance with an illustrative embodiment of the invention. The system 100 includes an update server 110 connected to a client device 150 through a communications network 140. Though shown singularly, client device 150 is representative of any number of devices that may comprise a homogeneous or heterogeneous population of client devices capable of being updated by update system 100. Each such client device 150 contains a current original image 120 constituting the software or operating code to be updated, which original image 120 is stored in non-volatile memory (not shown) of client device 150. Client device 150 also contains an update agent 156 that is comprised of download agent 152 for communicating with update server 110 and receiving update package 124 though communications network 140. Update agent 156 is further comprised of update decoder 154 that interprets and applies the update operations set of update package 124 in order to convert original image 120 into a new image 122. Though shown schematically as two separate elements, download agent 152 and update decoder 154 may be parts of the same application or software, be embedded firmware or specialized hardware such as an application specific integrated circuit (ASIC), which variations and possibilities for implementing the functionalities of download agent 152 and update decoder 154 will be obvious to one skilled in the art.

The update server 110 contains, generally, an update generator 122 and update manager 114. While depicted as a single element, update server 110 may alternatively be comprised of a server array or set of distributed computing devices that fulfill the purposes of update server 110. Update generator 122 creates update packages 124 through the use of a Binary Differencing Engine (BDE) 118 and update encoder 116. Update generator 122 maintains, or receives from an external source, an original image 120 corresponding to the subject client device 150 and is also supplied with or obtains a copy of the new image 122 for the subject client device. The BDE 118 receives a copy of the original image 120 and a copy of the new image to be applied 122 and, through a process of comparisons, generates lists or sets of COPY and ADD operations that are potential candidate operations usable in generating the update package 124. Update encoder 116 communicates with BDE 118 to combine additional encoding information to select operations from the BDE and incorporate other operations derived from additional information to ultimately create the update package 124. In the preferred embodiment, the update encoder 116 is highly integrated with the functionality of the BDE 118 so as to enhance optimization and speed of selecting and encoding operation sets. Update generator 112, consistent with the invention herein disclosed, generates the update package 124, which at the appropriate time or interval is supplied to the client device 150 via the update manager 114 through communications network 140.

The current invention specifically relates to improvements to the update encoder 116 and update decoder 154 that enable smaller update packages 124 to be produced. This is achieved through the addition of the RELOCATE operation to the package encoding. Each RELOCATE operation has two operands: the number of microprocessor instructions to be relocated and the associated number of data items to be relocated. Each individual encoding of the RELOCATE operation is chosen to efficiently express a commonly occurring combination of code/data items identified to be relocated in the encoding process.

In practice, it is commonly observed that tens or hundreds of RELOCATE operations may occur consecutively without intervening ADD or COPY operations. It is therefore beneficial to group such sequences between BEGIN/ENDRELOCATE operation pairs thus allowing each contained RELOCATE operation to be encoded more efficiently since it does not need to be distinguished from any other operation except ENDRELOCATE. The binary encoding of the update package between the begin/end pair thus effectively reduces only to efficient encoding of the operands of each RELOCATE operation. It is so common for RELOCATE operations to appear in groups of two or more, that in practice there is no need to have an encoding for a RELOCATE operation which does not appear between a begin/end pair even though the encoding of such single RELOCATE operations where they do occur becomes slightly less efficient as a result (since each requires its own begin/end pair).

As an example, one possible encoding scheme for the RELOCATE operation is of the form shown in Table 1:

TABLE 1

| RELOCATE | 1 byte forms | Bits 7...6 = 00<br>6 bits for number of instructions relocated<br>Number of data items relocated = 1<br>Bits 7...4 = 1111<br>Number of instructions relocated = 2<br>4 bits for number of data items relocated |
|---|---|---|
| | 2 byte forms | Byte 0, bits 7...6 = 01<br>9 bits for number of instructions relocated<br>5 bits for number of data items relocated<br>Byte 0, bits 7...6 = 10<br>12 bits for number of instructions relocated<br>2 bits for number of data items relocated<br>Byte 0, bits 7...3 = 11100<br>3 bits for number of instructions relocated<br>8 bits for number of data items relocated<br>etc. |
| | 3 byte forms | Byte 0, bits 7...5 = 110<br>16 bits for number of instructions relocated<br>5 bits for number of data items relocated<br>etc. |
| BEGINRELOCATE<br>ENDRELOCATE | 1 byte | Bits 7...0 = 11111110<br>must be distinct from other encodings, i.e. ADD/COPYADD etc |

Figure 1B:
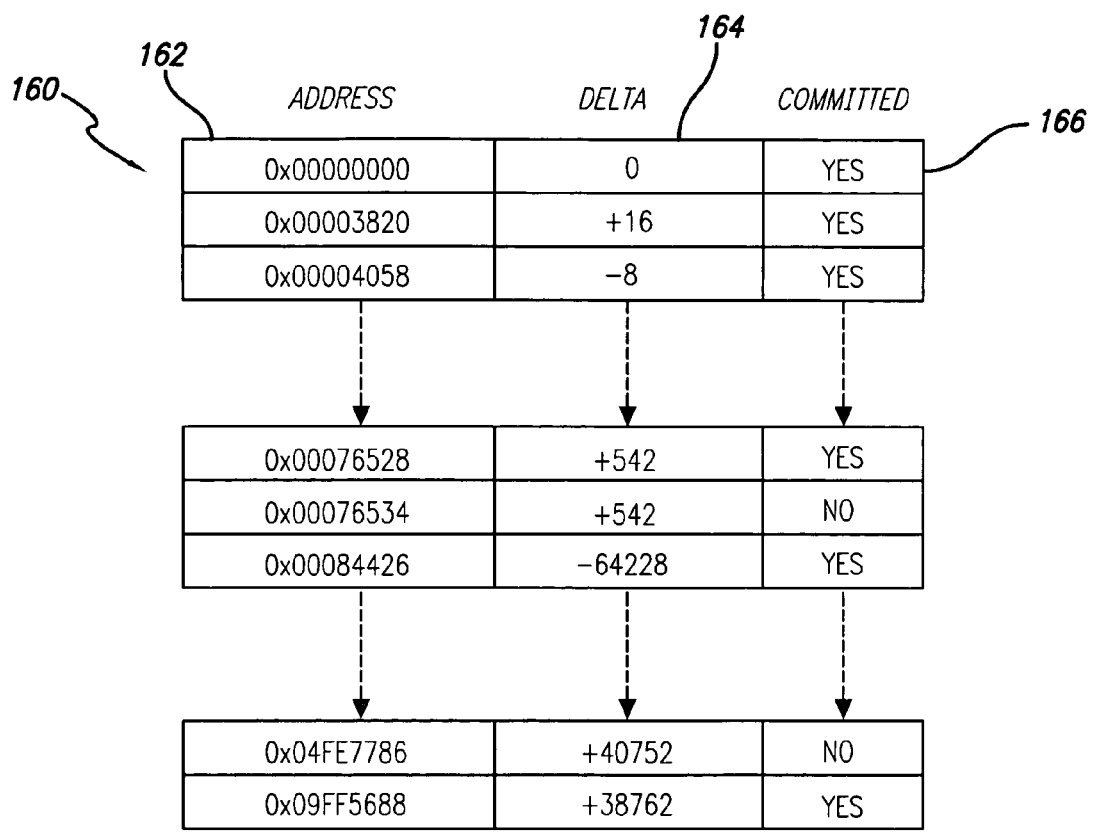
FIG. 1B is a table illustrating the form and content of the Address Translation Table.

The ATT 160, as shown in FIG. 1B, is comprised of a sorted list of addresses 162 each related to an associated delta value 164, beginning with a fixed address zero having a zero delta. The example ATT shown in FIG. 1B is illustrated having addresses and delta values produced by an encoding using the present invention. The addresses 162 relate to the original image 120, where the corresponding address in the new image 122 is found by adding the delta value 164 to the address. The same delta applies to all addresses between the specific address for which an entry in the table exists and the next higher address entry in the table (e.g. all addresses between 0x3820 and 0x4057 have a delta of +16 in this example). Finding a delta 164 for an address 162 therefore requires a search through the table to find the matching, or nearest lower, address from which the associated delta is taken. The committed flag 166 relates to the status of the ATT 160 contents as the table is being built. These fields are described below and used during the encoding of the ATT into the update package. Executing the encoding process may produce multiple consecutive addresses having the same delta value while the table is being constructed. To wit, ATT 160 has four operations. These operations are:

Status←ATT.fixRelocation(srcAddress, dstAddress), which adds an address/delta pair to the table to translate from srcAddress to dstAddress (i.e. adds an entry {srcAddress/delta} where delta=dstAddress−srcAddress). A status indicating whether the operation succeeds is returned. The processing is as follows: If there is no existing entry in the ATT for the exact specified srcAddress then a new entry is added with its committed flag equal to NO and the operation succeeds. If there is an existing entry in the ATT for the specified srcAddress but with a different delta then the operation fails. If there is an exact match in the ATT for the address/delta entry being added then the operation succeeds with no action being taken and the value of the existing entry's committed flag is left unchanged.

dstAddress←ATT.getRelocation(srcAddress), which returns the translated address for srcAddress using the translations present in the table. That is, the value of (srcAddress+delta), where delta is the one corresponding to srcAddress, either by exact match or for the next lower address entry present in the table.

ATT.rollback( ), which deletes all address/delta entries from the ATT having a committed flag equal to NO.

ATT.commit( ), which modifies all entries in the ATT having a committed flag equal to NO, such that their committed flag is set equal to YES.

Encoding

The present invention runs a high-level Binary Difference Engine (BDE) 118. The encoder 116 receives a stream of candidate ADD/COPY operations from the BDE that express the raw binary differences between the original image 120 and the new image 122. The encoder is modified to support an additional low-level operation referred to as RELOCATE. The output from the BDE 118 is provided to the encoder 116 as it is produced, one operation at a time.

The encoder 116 receives either an ADD or COPY operation identified and submitted by the BDE as the next required operation. If it is a COPY operation, the modified encoder attempts to re-express this operation with one or more RELOCATE operation(s) whose total length of 'copied' data exceeds that of the original COPY operation found by the BDE. If the total length does exceed that of the original COPY operation submitted by the BDE, the encoder encodes the RELOCATE(s) into the update package, and then returns a status to the BDE indicating that it has progressed further through the images than the original COPY covered. This enables the BDE to resume its differencing algorithm; adjusting for this increased length of data as though the original COPY operation had advanced this far through the images, to find the next required ADD or COPY operation. If the BDE submits an ADD operation to the encoder, or if re-expressing the COPY operation with one or more RELOCATE operations fails to progress as far through the images as the original COPY operation, then the encoder encodes the original ADD or COPY operation into the update package and returns to the BDE.

The identification and encoding process of a single RELOCATE operation consists of two phases. In the first phase, the encoder 116 starts from candidate offsets (a source offset within the original image, and a destination offset within the new image) to be expressed as a RELOCATE operation, where initially these offsets are those of the BDE's COPY operation. If the microprocessor instructions at these offsets are identical and are not jump/branch instructions (i.e. transfers of control) then the encoder immediately steps to the next instruction and repeats the above test. If the instructions at these offsets are however transfers of control in both images then the destination address of both transfers is calculated, and the delta between the destination addresses derived. The branch destination from the original image and associated derived delta (which may be zero) are added to the ATT. If an exact match for the address/delta pair already exists in the ATT then the table does not need to be modified. If a conflicting delta already exists in the ATT at that exact address, or if the instructions differ and are not transfers of control, then the encoder 116 records the number of instructions relocated up to, but not including, the current instructions and moves to Phase II, otherwise it steps to the next instruction and repeats the above processing.

The second phase of the RELOCATE encoding process requires that the offsets in both the original and new images are 32-bit aligned. If one or both are not, then simplistically the RELOCATE operation can be ended at this point with no data items being relocated. Specific processing that may allow the RELOCATE algorithm to continue to attempt to find relocate-able data are presented as additional details of the relocation algorithm later in this section. These details have been omitted from the flowcharts in FIGS. 2A and 2B in the interests of clarity. Each 32-bit aligned data value starting from the offsets immediately after the last instruction relocated in Phase I are sequentially compared between the original and new images and a delta calculated from the original to new values. This delta (which may be zero) is compared with that found from the ATT using the original image value as though it were an address. If the deltas match then an entry is added to the ATT using the original image value as the address. If an exact match for the address/delta pair already exists then the table does not need to be modified. The encoder then steps to the next 32-bit data value. The encoder repeats the above processing until a delta is found which does not match the ATT; at this point the encoder encodes a RELOCATE operation containing the number of instructions relocated in Phase I and the number of data values relocated in Phase II. The encoder now returns to Phase I to attempt to find a subsequent RELOCATE operation. Collectively, these two phases continue to process RELOCATE operations until at the end of Phase II the number of items relocated in both Phase I and Phase II is zero.

Figure 2A:
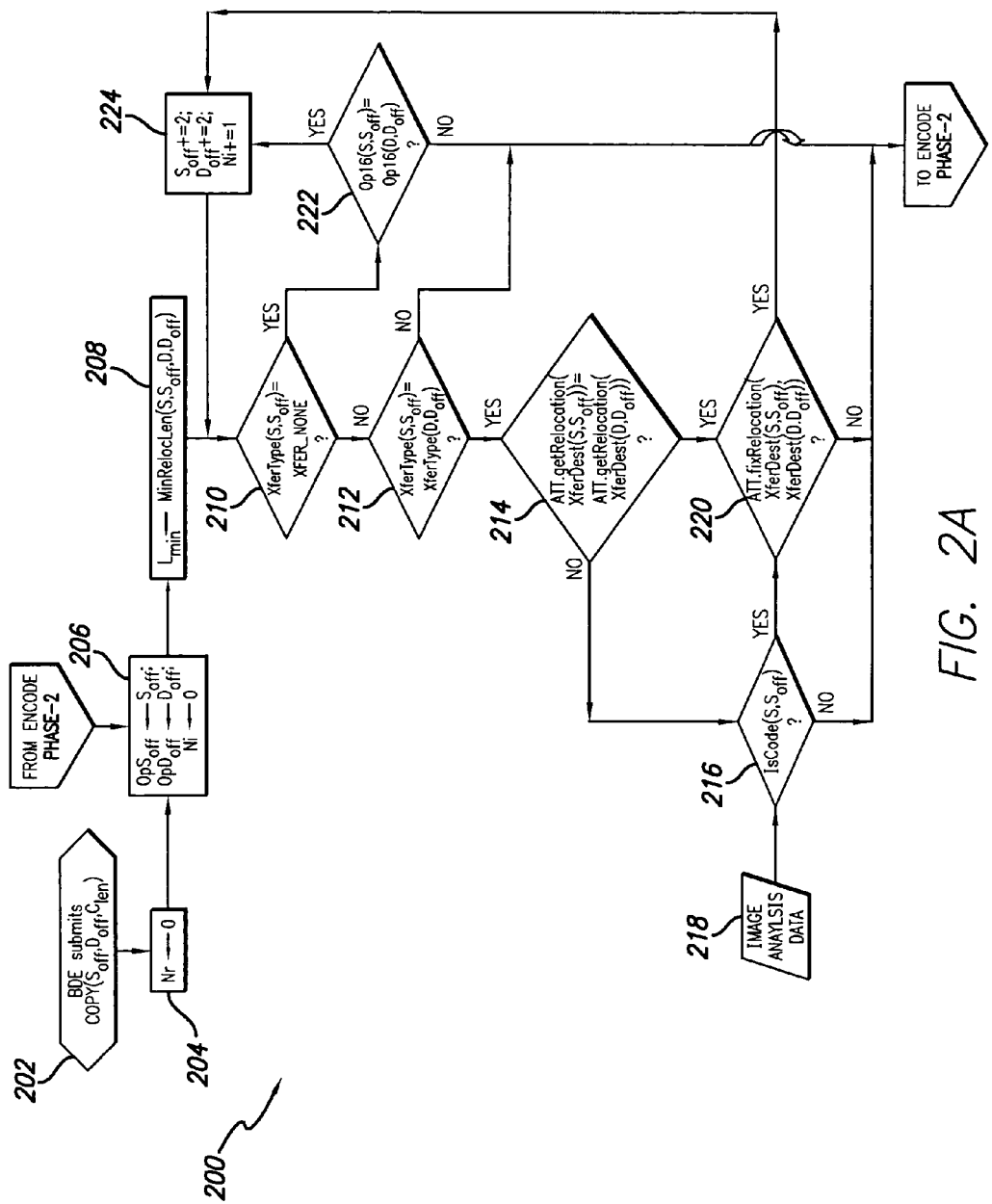
FIG. 2A is a flowchart illustrating the RELOCATE operation demonstrating instruction relocation (Phase I) encoding.
Figure 2B:
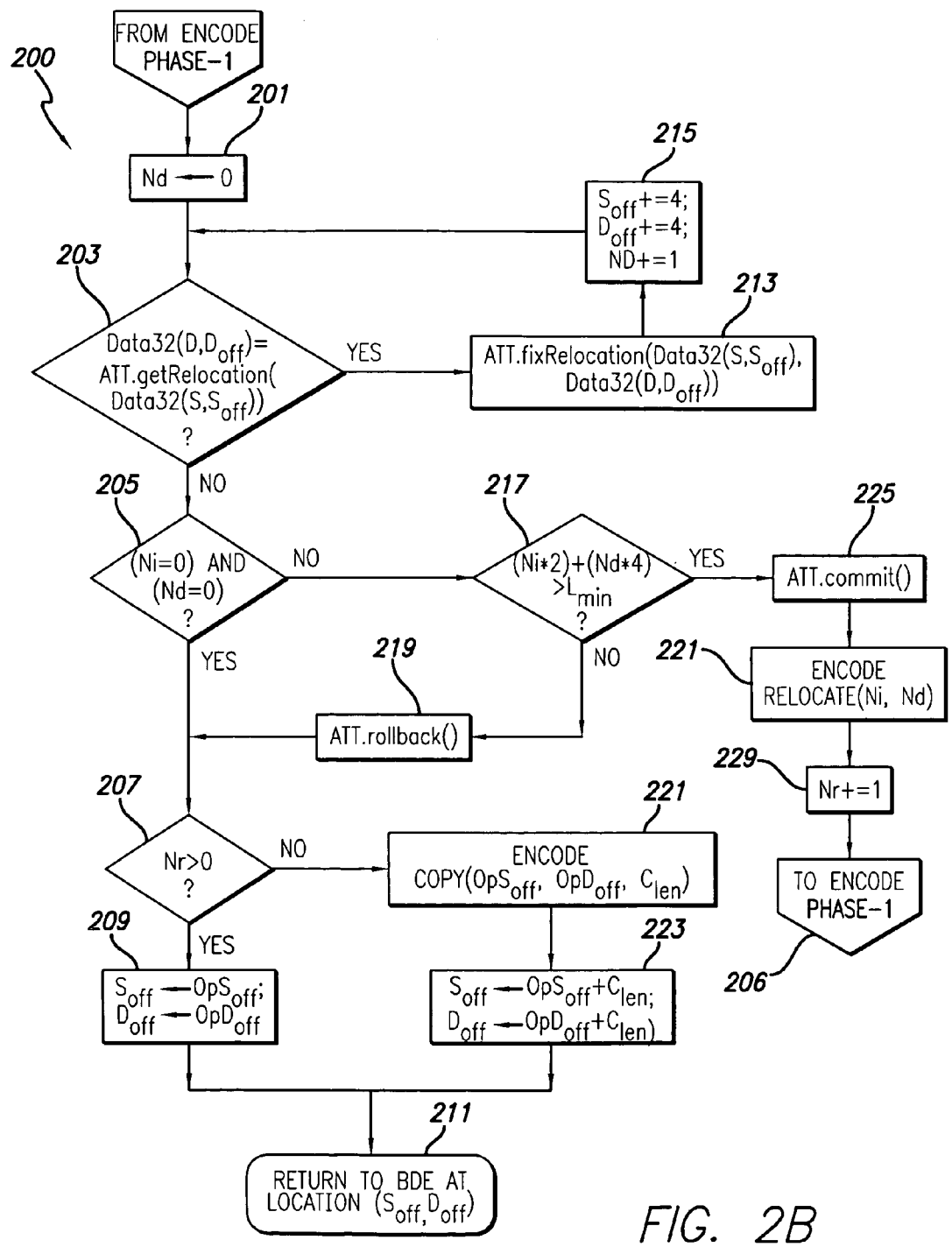
FIG. 2B is a flowchart illustrating the RELOCATE operation demonstrating data relocation (Phase II) encoding.

FIGS. 2A and 2B depict Phase I and Phase II processing for a reduced size update package 124 encoding system 200 employing an algorithm for relocating code and data. Specifically, together these flowcharts outline the instruction and data analysis required to identify appropriate RELOCATE operations. This modified encoding system yields an update package that may efficiently express differences between the original and new image fragments.

The flowchart shown in FIG. 2A, and subsequently the flowchart shown in FIG. 2B depict an outline of analysis required to identify appropriate RELOCATE operations to express differences between original and new image fragments. The detailed implementation of the encoder to support RELOCATE operations is inherently microprocessor-specific in nature, however the overall structure described here is completely generic and can be applied to any architecturally similar central processing unit (CPU), either big- or little-endian. The adjectives big-endian and little-endian refer to which bytes are most significant in multi-byte data types and describe the order in which a sequence of bytes is stored in a computer's memory. In a big-endian system, the most significant value in the sequence is stored at the lowest storage address (i.e., first). In a little-endian system, the least significant value in the sequence is stored first. Definitions for the notation used on the flowcharts in FIGS. 2A and 2B are as follows:

S and D—source (original) and destination (new) images. $S_{off}$ and $D_{off}$ are the current offsets within these images respectively;

COPY($S_{off}$,$D_{off}$,$C_{len}$)—the COPY operation submitted by the BDE that is being used to trigger the search for RELOCATE operations where $C_{len}$ is the length of the COPY in bytes;

OpS$_{off}$ and OpD$_{off}$—offsets into the source (original) and destination (new) images respectively at the end of the last operation encoded;

Ni and Nd—number of instructions and data items respectively that can contribute to the next RELOCATE operation;

Nr—number of RELOCATE operations that have been generated;

MinRelocLen (src,srcOff,dst,dstOff)—calculates lower threshold length for an individual RELOCATE operation at the current image offsets (source image src, offset srcOff, destination image dst, offset dstOff) below which it should be rejected as inefficient (typically, this would be the maximum length that a simple COPY operation could express at the same offsets);

$L_{min}$—records the MinRelocLen(...) threshold applicable to the current RELOCATE operation;

Op16(img,offset)—expresses the 16-bit instruction in image img at offset offset where calculation of this value must take into account the endianness of the CPU on which the image is intended to run;

XferType(img,offset)—expresses the type of control transfer performed by the CPU instruction in image img at offset offset; if no transfer type is applicable then the value XFER_NONE is used;

XferDest(img,offset)—where XferType(img,offset) above returns other than XFER_NONE, this operator expresses the full 32-bit 'destination' address of the transfer; such addresses are full virtual addresses within the address space of the CPU that executes code from the image (i.e. not simple offsets from the start of the image); thus, the addresses may lie outside the address range covered by the image itself;

Data32(img,offset)—expresses the 32-bit data value in image img at offset offset where calculation of this value must take into account the endianness of the CPU on which the image is intended to run;

The ATT. operators being the four operations as described previously in this section;

RELOCATE(ni,nd)—expresses a RELOCATE operation of ni instructions and nd data values to be encoded within the update package; and BEGIN/ENDRELOCATE—for simplicity, the flowchart does not show generation of BEGIN/ENDRELOCATE operations to group uninterrupted sequences of RELOCATEs.

Referring now to FIG. 2A, a method for identifying candidate RELOCATE instructions in accordance with the present invention is illustrated. The RELOCATE instruction process commences at 202 where the BDE 118 submits candidate COPY operations, one operation at a time, as they are generated during the comparison of original image 120 and new image 122.

At 204 the count of RELOCATE operations generated so far is initialized to zero. At 206, the image offsets at the end of the last operation actually encoded are recorded for later use, and the count of instructions relocated as part of the current RELOCATE operation is initialized to zero. The lower threshold length for an individual RELOCATE operation is calculated at 208 using the original 120 and new 122 images and the associated current offsets within those images respectively. This threshold is recorded as the minimum relocation length below which a RELOCATE operation should be rejected as inefficient. Typically, this would be the maximum length that a simple COPY operation could express at the same offsets. For very small COPY lengths, an arbitrary lower limit may be imposed (e.g. 8 bytes) to avoid excessive numbers of ATT entries being added over small regions of the image where ultimately a simple ADD operation might be more efficient.

The main processing loop within the encoder for Phase I begins at step 210, and includes step 222 and step 224, returning to step 210. This loop represents the relocate algorithm behavior that checks each single instruction and then moves to the next instruction. Moving on, at 210, the encoder 116 begins from the original image candidate offset to be expressed as a RELOCATE operation. Initially, this original image 120 offset is obtained from the COPY operation submitted by the BDE 118 at step 202. At 210, the relocate algorithm examines the single 16-bit instruction in the original image, found at this offset, looking for a transfer of control instruction. If the encoder finds the type of microprocessor instruction from the original image is not a transfer of control (i.e. as indicated by a transfer type of XFER_NONE), which is the common case, the processing moves to step 222. At 222, the encoder looks for non-matching instructions of any type. The encoder 116 compares the instruction in the original image to the instruction in the new image at their respective offsets, to determine if they are identical at the binary level. If these instructions are identical, step 224 increments the offset into each image such that the process can begin again by returning to step 210 to inspect the next instructions in the images. In addition, step 224 increments the number of instructions that can contribute to the next RELOCATE operation by one. However, if the instructions do not match, step 222 moves the processing to Phase II and begins attempting to relocate data items as part of the RELOCATE operation.

However, if at 210 the encoder finds the type of microprocessor instruction from the original image is a transfer of control (i.e. its type is not XFER_NONE), the relocation algorithm moves to step 212 where the type of control transfer found in the original image is compared to the type of control transfer found in the new image. If it is determined that the transfer types are not the same (including the case where the instruction in the new image is not a transfer of control), step 212 moves the processing to Phase II.

If at step 212, it is determined that the transfer types are the same, a check is made at 214 to determine if the destination address of the transfer in the new image would match that provided by translating the destination address of the transfer in the original image using the ATT. If the translated addresses do match, then at 220, the encoder adds an entry to the ATT using the destination address from the original image as the address, and the difference between the destination addresses as the delta. If an exact match for this address/delta pair already exists in the ATT then the table does not need to be modified (where step 214 leads directly to 220 in this way, it is not possible for a conflicting delta to exist in the ATT).

If however at step 214 it is determined that the translated destination addresses do not match, step 216 optionally examines the images to determine if the item being relocated is actually code. Simplistically, step 216 may always indicate that the item is code if no further information is available as to whether the item is code or data. However, if the transfers are actually data items that simply appear to be code, then the entry added to the ATT in 220, although still allowing the specific item to be relocated correctly, may make the overall update package encoding less efficient. Where possible therefore, analysis of the images themselves, and/or of the associated link maps, should be undertaken to determine whether the item being relocated in likely to be code or data; the results of this analysis are held in 218. If the item is determined not to be code, then step 216 moves the processing to Phase II.

If the RELOCATE item is determined to be (or is assumed to be) actual code, the ATT 160 is appropriately updated at 220. A new entry is added to the ATT using the transfer destination in the original image as the address, the difference between the destinations in the original and new images as the delta, and the committed flag is set to NO. The encoder then returns to step 224 to increment the count of relocated instructions and start inspection of the next instruction in the image.

However, if a conflicting delta value is found to already exist in the ATT for the exact destination address, then instead the processing moves to Phase II.

Referring now to FIG. 2B, a method for identifying candidate RELOCATE data in accordance with the present invention is illustrated. The RELOCATE data process commences where during Phase I any of the four encoding steps: 212, 216, 220, and 222 exits to the data relocation encoding process, Phase II. At 201, the count of data items relocated so far is initialized to zero. The main processing loop within the encoder for Phase II begins at step 203, and includes step 213 and step 215, returning to step 203. This loop represents the relocate algorithm behavior that checks each single data item and then moves to the next data item.

Beginning with the image offsets immediately after the last instruction relocated in Phase I, step 203 compares the 32-bit aligned data value in the original image with the corresponding value in the new image and calculates a delta value from the difference between the two data values. The encoder 116 compares this delta, which may be zero, with the delta value found in the ATT 160 using the data value from the original image as though it were an address. If the delta values match, the encoder adds an entry at 213 to the ATT 160 using the data value from the original image as the address, and the calculated delta. If an exact match for this address/delta pair already exists in the ATT then the table does not need to be modified (it is not possible at 213 for a conflicting delta to exist in the ATT, therefore the modification must succeed). The committed flag of the new ATT entry is set to NO. In order to continue the data comparison process at 203, the image offset values are incremented in step 215 to the next 32-bit data value. Additionally, step 215 increments the number of data items that can contribute to the RELOCATE operation.

The above sequential comparison processing at 203 repeats until a delta value is found which does not match the ATT, at which point processing moves to step 205. If either the number of instructions or data items relocated is not equal to zero, then the number of instructions and data items that can contribute to the RELOCATE operation are used at 217 to calculate the length of the RELOCATE operation. This is compared to the recorded minimum RELOCATE length threshold from step 208. If a value greater than the minimum threshold is calculated at 217, then all entries in the ATT with committed flags equal to NO are modified at 225 to have committed equal to YES (i.e. ATT.commit). The current single RELOCATE operation is encoded at 227 into the update package, containing the number of instructions relocated in Phase I, and number of data items from Phase II. Next, at 229, the number of RELOCATE operations that have been generated is incremented by one and the encoder 116 returns to Phase I to attempt to find subsequent instructions to relocate (i.e. as part of a potential following RELOCATE operation).

However, if at 217, the calculated length of the RELOCATE operation is less than or equal to the minimum RELOCATE length threshold, then step 219 deletes all address/delta entries from the ATT with committed flags equal to NO (i.e. ATT.rollback). This essentially discards the last RELOCATE without encoding it.

Next, the number of RELOCATE operations encoded is determined at 207. If this number is greater than zero, the offsets into the original 120 and new 122 images at the end of the last operation encoded are recovered at 209 and are set to become the next image starting points for the BDE. Encoder step 211 returns to the BDE at this updated location. Essentially, the effective length of this RELOCATE is larger than the original COPY submitted by the BDE.

However, if at 207, the number of RELOCATE operations encoded equals zero, then step 221 encodes the COPY operation exactly as originally submitted by the BDE at step 202. The new image offsets are calculated at 223, by increasing each by the length of the COPY operation so that they point at the first byte of each image beyond the end of the COPY just encoded; these become the next image starting points for the BDE 118. Encoder step 211 returns to the BDE at this updated location.

Some required details of the relocation algorithm have been omitted from the flowcharts in FIGS. 2A and 2B in the interests of clarity. These notes are presented here for completeness:

FIG. 2A, at step 202:
  Since both instructions and data items in the image are assumed to be at least 16-bit aligned, if the even/odd byte alignment of $S_{off}/D_{off}$ in the BDE's candidate COPY operation differs, then the COPY is not a candidate to be expressed as a RELOCATE operation and can be submitted as-is immediately.

FIG. 2A, at step 202:
  If both $S_{off}$ and $D_{off}$ in the BDE's candidate COPY have odd byte alignment then both should be advanced by 1 byte and the search for a RELOCATE operation performed as per flowcharts in FIGS. 2A and 2B using these adjusted values. Since the byte at the initial odd offset is known to match in both images (it forms part of a simple COPY) any RELOCATE operation subsequently found can be correctly decoded simply by checking if the operation starts at an odd address, and if so, copying one byte from original to new image prior to decoding the RELOCATE itself.

FIG. 2B, at step 201:
  To start Phase II processing requires that both $S_{off}$ and $D_{off}$ are 32-bit aligned. If one or both are not, then simplistically the RELOCATE operation can be ended early with no data items being relocated. However, the following actions can be taken to allow the RELOCATE algorithm to continue to attempt to find relocate-able data:
  Case 1: $S_{off}$ 16-bit aligned, $D_{off}$ 32-bit aligned: simply advance $S_{off}$ by 2 bytes. This skips 16-bits of the original image as potential copy source; the decoder must make a similar adjustment when a decoded RELOCATE ends Phase I with this alignment combination. This adjustment corresponds to the shuffling effect occurring at the end of an instruction group on a non-32-bit aligned boundary, which is then moved by an odd-multiple of 16-bits in the new image. The following data must still be 32-bit aligned and thus the 16-bit filler between code and data in the original image would cease to exist in the new image.
  Case 2: $S_{off}$ 32-bit aligned, $D_{off}$ 16-bit aligned: provided Phase I relocated at least one instruction, adjust $D_{off}$ down by 2 bytes and the number of instructions relocated down by 1 before starting Phase II. As seen by the decoder, the result of this adjustment is to make the alignment appear as for case 1 above, and will thus trigger the appropriate adjustment to match that made by the encoder.
  Case 3: Both $S_{off}$ and $D_{off}$ non-32-bit aligned: provided Phase I relocated at least one instruction, adjust $S_{off}$ and $D_{off}$ down by 2 bytes and the number of instructions relocated down by 1 before starting Phase II.
  In cases 2 and 3 above, if Phase II subsequently relocates no data items, but the Phase I result was adjusted down as described, then the adjustment can be reverted and the original instruction count used to encode the RELOCATE operation (if no data items are relocated, the final alignment at the end of Phase I is unimportant).

Additional Encoding Embodiments

In another embodiment of the present invention, use can be made of symbolic information relating to the binary images that may be available in the form of link maps produced by the software build tools used to produce the images. This information can be used to pre-load the ATT with a reasonably good outline of the movement of code and data within the images. This information may also be acquired from some common non-binary image formats (e.g. an Executable and Linkable Format (ELF) image).

The first step is to correlate symbol names between original and new images to obtain the corresponding addresses in the two images. From each correlated symbol, an address/delta pair can be derived and pre-loaded into the ATT prior to starting the differencing process. This mechanism may cause some pre-loaded address/delta pairs to be available in the ATT, but which remain unreferenced when generating the update package, and which are still finally encoded and written into the update package 124—thus including redundant information in the final update package. To remove this inefficiency it is necessary to add a type qualifier to each ATT entry, indicating whether a particular entry is actually required or is only a 'hint'. This type indicates whether a particular ATT address/delta pair entry has actually been referenced by the encoding process (i.e. is required) or is simply a correct address/delta entry but which hasn't so far been referenced by any RELOCATE operation encoding (i.e. for the purposes of this discussion, is a 'hint').

In practice, ATT entries can have types of REQUIRED, HINT or REQUIRED_HINT, the usages of which are described below. All ATT entries pre-loaded as a result of using link map data must have a type of HINT. Although use of data from link maps alone would only ever result in HINT type entries being added in the initial pre-loaded ATT, other uses of translation hints employed by other embodiments of the current invention described later result in such HINT entries also being added to the ATT during the differencing process itself.

Entries of type HINT behave like entries in the table with a committed flag equal to YES in all respects except that any such entries that remain at the end of the differencing process are not written into the final update package 124. If a translation entry is added to the table that exactly matches an existing hint entry then the type of this entry must be changed to REQUIRED ensuring that it is written into the update package. If the ATT is pre-loaded with hint entries from a link map, or other pre-processing operation, these entries must have their committed flag set to YES prior to commencing the main differencing process.

To wit, ATT 160 has the following four modified operations to provide this behavior. These four modified operations are:

Status←ATT.fixRelocation(srcAddress, dstAddress, type), which adds an address/delta pair to the table to translate from srcAddress to dstAddress (i.e. adds an entry {srcAddress/delta} where delta=dstAddress−srcAddress). A status indicating whether the operation succeeds is returned. The processing is as follows: If there is no existing entry in the ATT for the exact specified srcAddress then a new entry is added with its committed flag equal to NO, and with the specified type which may be either REQUIRED or HINT, and the operation succeeds. If there is an existing entry in the ATT for the specified srcAddress but with a different delta then the operation fails. If there is an exact match in the ATT for the address/delta entry being added the processing is as follows:

If the existing type is REQUIRED, or REQUIRED_HINT, or the new type is HINT, then the operation succeeds with no action being taken;

If the existing type is HINT and the new type is REQUIRED then the type of the existing entry is changed to REQUIRED_HINT and the operation succeeds. The value of the committed flag is unchanged.

dstAddress←ATT.getRelocation(srcAddress), which returns the translated address for srcAddress using the translations present in the table. That is, the value of (srcAddress+delta), where delta is the one corresponding to srcAddress, either by exact match or for the next lower address entry present in the table.

ATT.rollback( ), which deletes all address/delta entries from the ATT having a committed flag equal to NO, and then for any remaining entries with type equal to REQUIRED_HINT, sets their type equal to HINT.

ATT.commit( ), which modifies all entries in the ATT having a committed flag equal to NO, such that their committed flag is set equal to YES, and then modifies any entries with type equal to REQUIRED_HINT, such that their type is set equal to REQUIRED.

In a further embodiment of the present invention, improving the quality of the entries added to the ATT 160 can further reduce update package sizes as follows. In the simplest embodiment of this invention, during the encoding process, the ATT is initially empty and the contents are built up during the differencing process. RELOCATE encodings performed towards the end of the process have more relocation information available to them (a more fully populated ATT) than those performed at the beginning. The result is that the later encodings tend to be better than those produced earlier (particularly those related to data item relocation).

This disparate effect can largely be removed by running the difference process twice on the same image pair. The only information retained from the first run however is the content of the resultant ATT, the content of which is pre-loaded into the ATT used for the second run. During this pre-loading, all ATT entries of type REQUIRED must be changed to type HINT. This makes the ATT appear to the second run of the differencing process just as though it were pre-loaded from link map data. This method ensures that no ATT entries are retained in the final update package that are not strictly required after the second run.

This method can further be combined with that of pre-loading the ATT from data derived from real link maps as previously described. To this end, the first run of the differencing process uses the ATT pre-loaded from link map data (where all entries are of type HINT). At the end of the first run, the resulting ATT is processed as described above prior to starting the second run—which thus starts with all entries derived from the original link maps plus any further information derived during the first run. No entries relating to the original link maps will be deleted prior to the second run since HINT entries can never be removed from the ATT, only potentially promoted to type REQUIRED during the first run. These two methods combined maximize the amount of information available to the update encoder from the ATT during the whole of the second run of the differencing process.

A further embodiment of the present invention provides an indirect address analysis and usage mechanism used to improve (i.e. reduce) update package sizes. The encoding algorithm presented in FIGS. 2A and 2B is primarily focused on relocating code sections, or references to code from embedded data. With the extended ATT format used to support pre-loading data from link maps, further information can be extracted from the image during the differencing process that can be used to improve the efficiency of both code and data relocation.

The simplest example of this technique is to take advantage of indirect loading of addresses from data areas. This is a very common construct for 16-bit RISC CPUs as they do not have the ability to load absolute 32-bit values/addresses directly.

The ARM/Thumb processor has a Load Register instruction (LDR) which loads a 32-bit data item from data embedded within the code; one of the most common usages of this instruction in its PC-relative form, is to load the base address of a data area. If, during Phase I of the RELOCATE processing, identical PC-relative LDR instructions are found in both images, then the address of the data item being loaded can be calculated in both images, and the 32-bit value of the data item at that location determined provided that its location falls within the images themselves.

If it is assumed that all such LDR instructions are in fact loading addresses from memory, then the two 32-bit values just found represent corresponding addresses within the two images. These can thus be used to add an appropriate address/delta entry 'hint' to the ATT.

Because the LDR instruction is not a transfer of control, the hint entry is not required to relocate the LDR instruction itself, this is simply copied provided it is identical at the binary level between the two images. Thus, failing to add such a hint to the ATT (e.g. because a conflicting delta already exists for the same address) is not an error; the hint is simply discarded. The hint generally helps later in the RELOCATE encoding, typically during Phase II data relocation.

The key point about this manipulation is that it adds translations to the ATT that relate to movement of data areas within the image. Pre-loading entries from link maps will also in general achieve this; however, the granularity of the information added by the mechanism above tends to be much finer than that available from link map information.

The PC-relative form of the LDR instruction is not only used to load addresses but it is by far its most common use. Image analysis can be used to eliminate cases that are not address related loads, but this is much more complex, and in practice, the benefit of processing all such LDR instructions is substantial even when it includes incorrect ATT entries added due to non-address loads.

A more complex example of indirect address analysis and usage is the identification of compiler-generated switch statements and use of the associated jump tables to add relocation hints to the ATT.

In the same way that LDR instructions are identified and correlated in the previous example, there are various standard 'switch' constructs used by compilers that can be identified and the associated code entry points extracted from their jump tables. If two such switch constructs are matched within Phase I of RELOCATE processing, and their jump tables are of the same size, this yields a set of new ATT translation hints, one for each entry in the jump table. Each individual entry is handled in exactly the way described for the single address pair obtained from correlation of the LDR instructions. Again, failing to add any of these 'hints' to the ATT is not an error, the hints simply being discarded.

Unlike the LDR case discussed previously, the ATT entries found via this mechanism relate to code, not to data, however the principle is identical.

There are several commonly occurring switch constructs that might need to be identified in the general case, however if the difference engine is only to work on images produced by the same compiler then only the specific required cases need to be identified. Note also that the particular registers used within the switch constructs are not fixed—even within one image—thus correct recognition of the constructs requires identification of the register sequences used, not the exact registers.

Another embodiment of the present invention employs the RELOCATE Phase I and II processing method described above, and attempts to perform a RELOCATE operation after each BDE 118 submitted COPY operation. This "RELOCATE after COPY" operation extends the previously described encoding algorithm to attempt to start a RELOCATE operation at the end of the BDE's candidate COPY operation if the COPY operation itself cannot be replaced by a RELOCATE (e.g. minimum threshold relocation criteria not met).

Figure 2C:
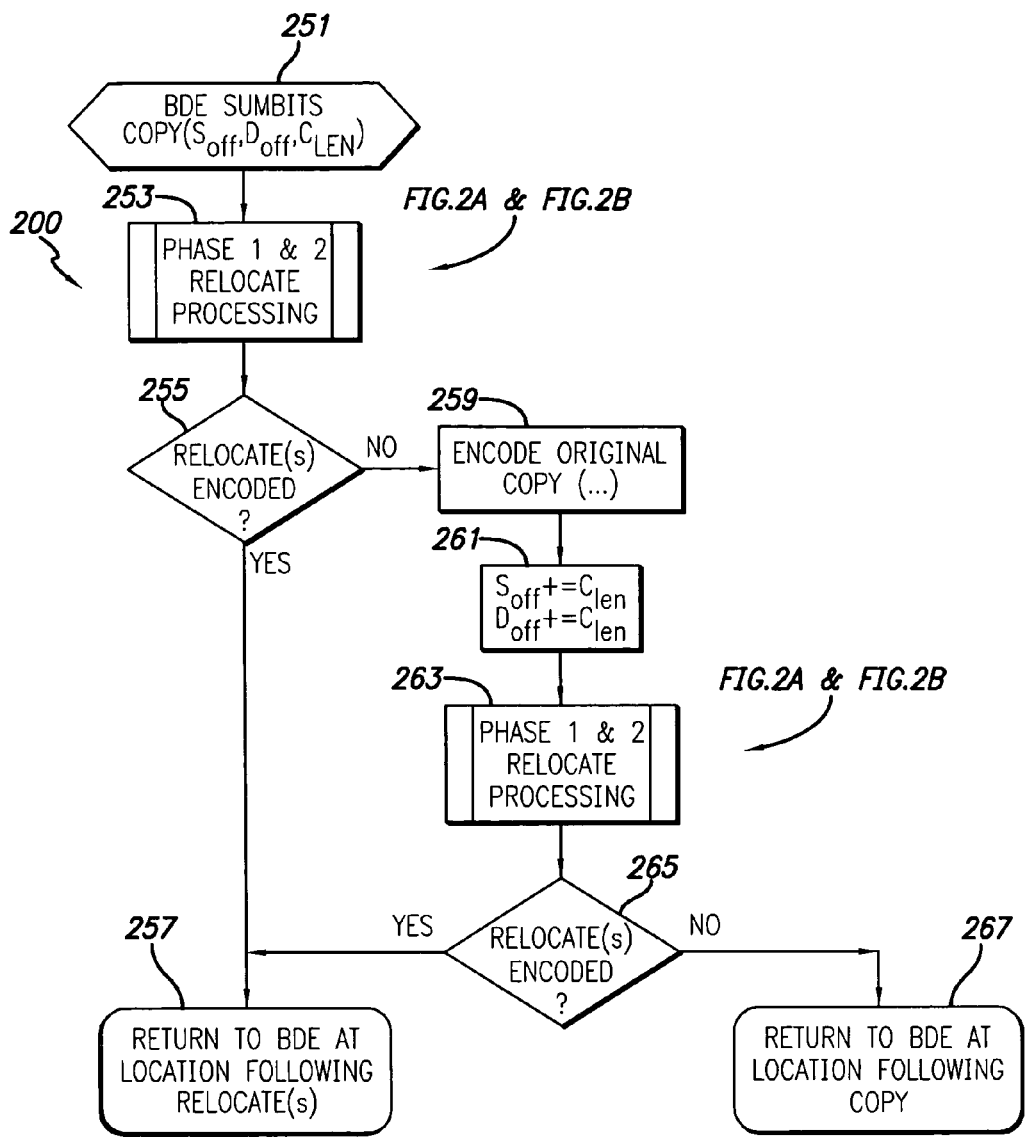
FIG. 2C is a flowchart illustrating the RELOCATE after COPY encoding.

FIG. 2C illustrates a method for identifying "RELOCATE after COPY" operations in accordance with the present invention. The "RELOCATE after COPY" process which commences at 251 when the BDE submits a COPY operation to the update encoder. At 253, the Phase I and Phase II instruction and data relocation processing (encapsulating the core processing of FIGS. 2A and 2B) is executed for each COPY operation submitted by the BDE. Once this processing is complete, a check is made at 255 as to whether the COPY was replaced by one or more RELOCATE operations, and if so, the process moves to 257. The processing control is returned at 257 to the BDE at the location following the RELOCATE operation(s) generated in step 253.

However, if no RELOCATE operation was generated at 253, the original COPY submitted by the BDE is first encoded at 259, and the offsets within the images updated to point to the first bytes beyond the end of the COPY at 261 (this processing is shown here explicitly for clarity, but reproduces that shown in FIG. 2B, steps 221, and 223—the COPY is however only encoded once). Next, encoder 116 again executes the core Phase I and II processing at 263 (in detail this processing must differ slightly since no COPY operation is supplied, though it might be considered that a zero-length COPY is supplied at the appropriate offsets, however the overall intent should be clear to one skilled in the art).

If any RELOCATE operations are generated at step 263 the process moves to step 257, where control is returned to the BDE at the location following the last RELOCATE operation generated in step 263. However, if no RELOCATE operations are generated at 263, the process moves to step 267 where control is returned to the BDE at the location following the COPY operation encoded in step 259.

This scheme of encoding a RELOCATE in this way directly after the submitted COPY, where possible, is highly likely to be more efficient than returning immediately to the BDE, as the latter course of action is very likely to cause the BDE to express the following bytes using an ADD operation (the least size efficient option of all) in a manner similar to that described in application patent application Ser. No. 10/676,483.

A further embodiment of the present invention is an efficient method for encoding the ATT 160 into the update package. This improves the overall size reduction achievable when using the RELOCATE operation. The method used to compress the ATT begins with discarding all address/delta pairs found of type HINT; these entries are not required by the decoder process as indeed are neither the committed nor type flag information which are simply discarded. Additionally, when the encoder finds sequences of consecutive address/delta pairs having the same delta, all but the first such entry in each sequence is discarded from the ATT. Again, such entries are not required by the decoder process.

Next, the table is split into two equal-length lists, one containing addresses, and the other containing the corresponding deltas. Each list is now further compressed by expressing each as a list of difference values, where each value is the difference between two consecutive entries in the original list. Neither address nor delta difference values can be zero. These differencing values tend to be small in the resulting lists, allowing them to be efficiently expressed using a variable length encoding technique. A suitable byte-orientated format is to encode the low-order 7 bits of the value with bit 7 clear if this is sufficient to contain its entire value or with bit 7 set if more data is required. Subsequent groups of 7 bits can be encoded in a similar way until the entire value has been encoded. The address differences are always positive, whereas the delta differences are signed, thus the variable length encoding scheme for delta values needs to take into account any required sign extension when extracting the value during decoding.

The values encoded in the previous step can be further reduced in size by noting that virtually all addresses and delta differences are in practice even values (a result of the aligned 16-bit nature of typical RISC CPU code and data). These values can be more efficiently encoded by right-shifting them by one bit before applying the above RLE encoding. To allow the rare case of an odd difference to be expressed, a zero byte can be written prior to output of the RLE encoding; this simply indicates that bit-0 of the following encoded value should be set once decoded. The first byte of an encoding using the above scheme could not otherwise be zero since it would correspond to a zero difference. In this encoding, a difference value of '1' would be encoded as two consecutive zero bytes.

Finally, the two resulting lists can be written to the update package using a standard loss-less data-compression library such as zlib to provide the final degree of ATT compression.

Decoding

Figure 3A:
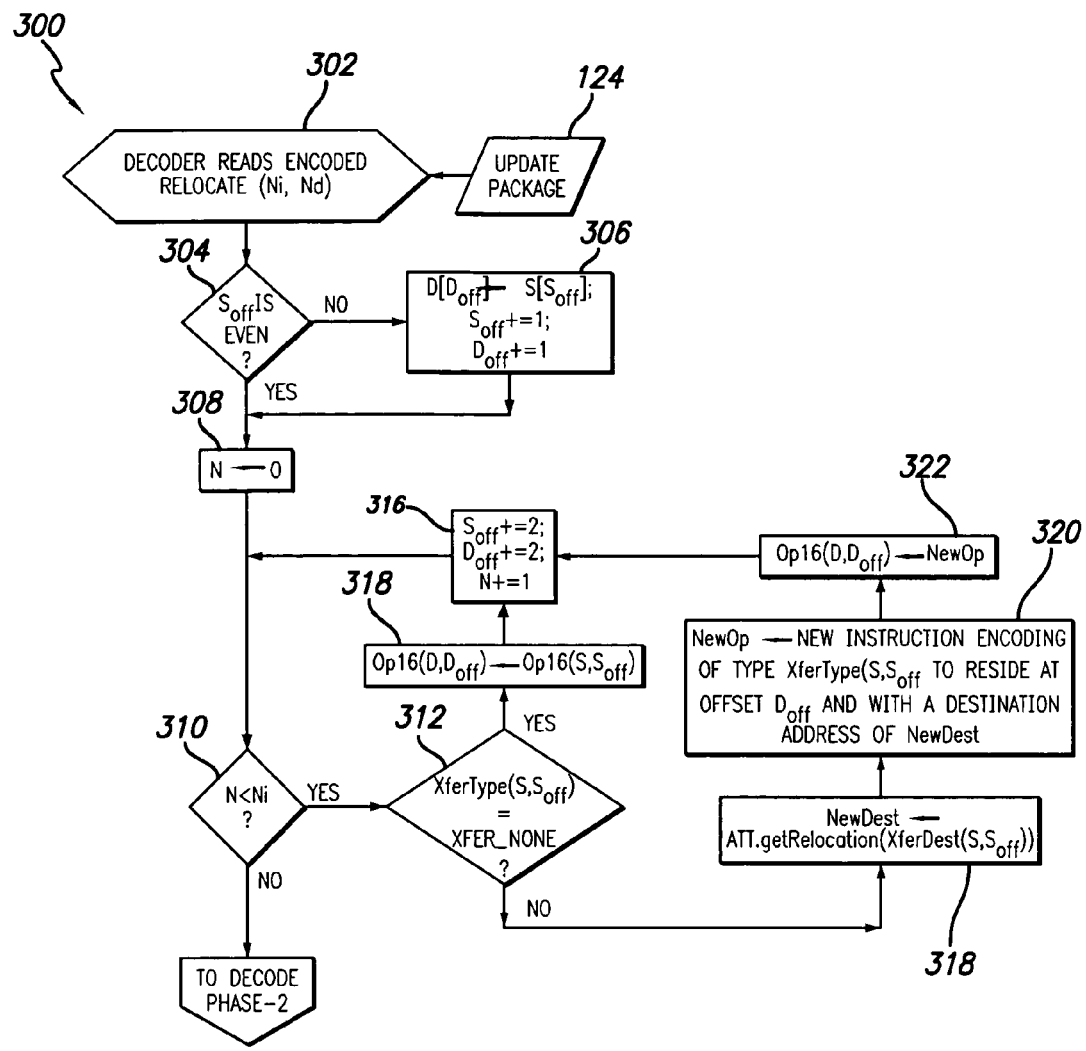
FIG. 3A is a flowchart illustrating the RELOCATE operation demonstrating instruction relocation (Phase I) decoding.
Figure 3B:
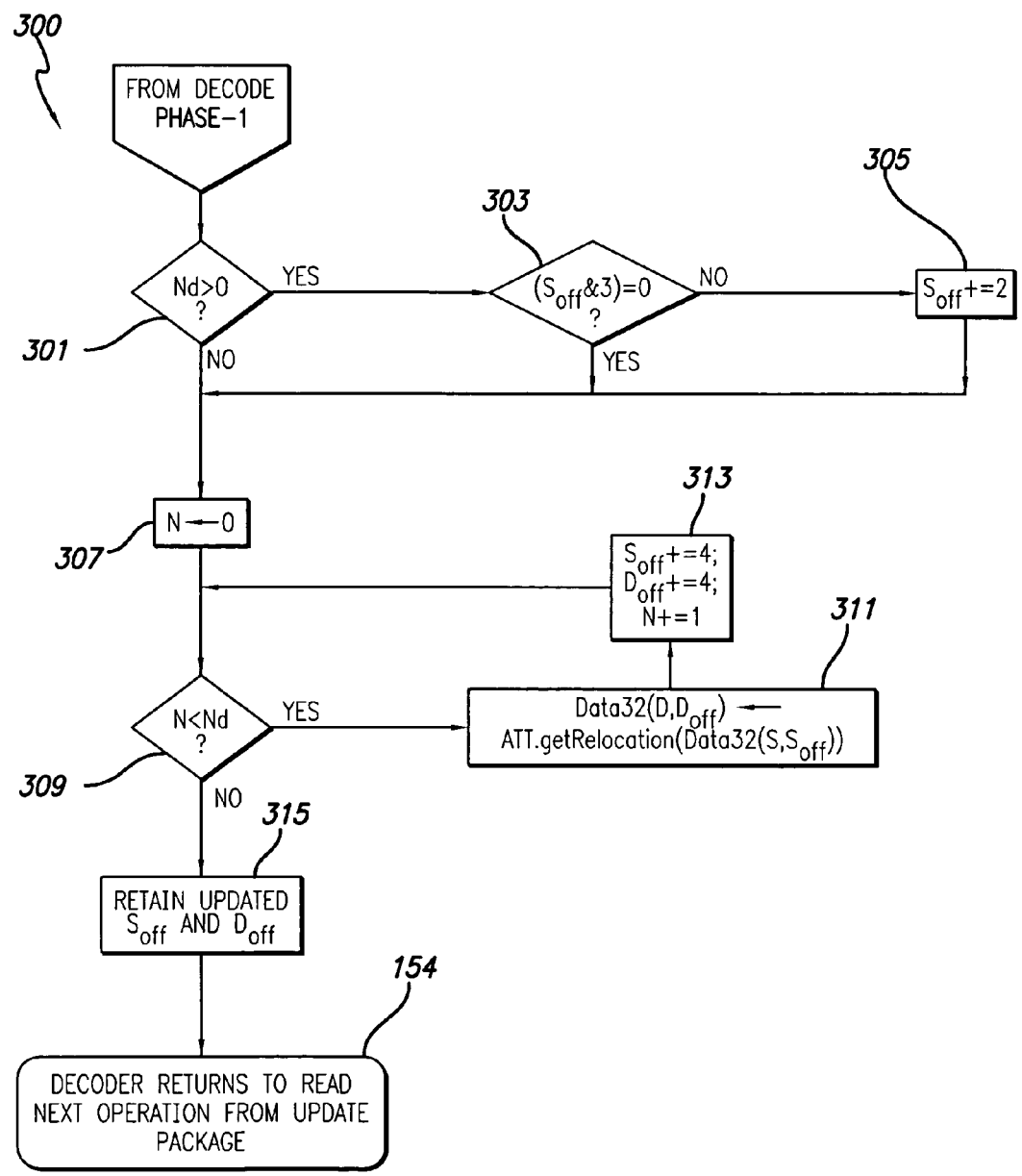
FIG. 3B is a flowchart illustrating the RELOCATE operation demonstrating data relocation (Phase II) decoding.

The process required to decode an individual RELOCATE operation from an update package and apply the required changes to convert a fragment of the original image into the corresponding new fragment is shown in FIGS. 3A and 3B.

The decoder retrieves each operation, in the order provided, from the update package. If the decoder encounters an ADD or COPY operation, it will process these operations consistent with the method described in U.S. patent application Ser. No. 10/676,483 entitled "Efficient System and Method for Updating a Memory Device", filed Sep. 30, 2003. If the decoder encounters a RELOCATE operation, it first copies instructions from the original image to the new image and relocates all transfers of control found within those copied instructions according to the address/delta information provided within the ATT. Next, the decoder copies data from the original image to the new image and relocates each data item according to the address/delta information provided within the ATT.

Prior to decoding any operations, the ATT must be reconstructed from its compressed form in the update package 124. The structure of this reconstructed ATT is identical to that used during the encoding process with the exception that it is strictly a read-only table during decoding such that only the address and delta values need be present. The decoding process of a single RELOCATE operation consists of two phases, shown in FIGS. 3A and 3B respectively. Definitions for the notation used on the flowcharts in FIGS. 3A and 3B are the same as those used for the flowcharts in FIGS. 2A and 2B, with the following addition: the notation img[offset] is used to indicate the byte at offset offset within image img—used as either a source or destination.

The decoding process begins by reading a single RELOCATE operation, at 302, from the update package 124. The RELOCATE operation provides the number of instructions (i.e. Ni) and number of data items (i.e. Nd) to be relocated. The first phase relocates the number of instructions specified within the RELOCATE operation. The second phase relocates the number of data items specified within the RELOCATE operation.

The decoder 154 accesses the ATT when any instruction being moved is found to be a transfer of control and for each data item moved. When transfer of control instructions are found, or a data item is relocated, the destination address of the transfer of control in the original image, or the data item value in the original image, is used as an address with which to access the ATT to obtain an associated delta value and thence a corresponding address in the new image, from which the transfer of control or data item can be modified as necessary to construct the desired second image 122 from the first image 120 resident within the client device 150, and the update package 124. The decoder continues to read the update package sequentially, processing each ADD, COPY, or RELOCATE operation until all operations have been decoded. FIGS. 3A and 3B depict an update package 124 decoding system 300 for constructing the second image from the first image by applying an update package constructed in accordance with the present invention. Specifically, together these flowcharts outline the update package analysis required to build the second image from the first image and information found in the update package. This modified decoding system 300 yields a new image on the client device.

Referring now to FIG. 3A, the method required to decode and relocate instructions from a RELOCATE operation read from the update package 124 is illustrated. The process of decoding a single RELOCATE operation begins at 302 where an encoded RELOCATE operation is read from the update package 124. The RELOCATE operation specifies the number of instructions and the number of data items to be relocated. The decoder process maintains the persistent values of original and new image offsets that identify the current locations within the original and new images carried over from the last operation decoded.

The value of the original image offset (i.e. $S_{off}$) is examined at 304 to determine whether it represents even or odd byte alignment. If the original image offset is found to have odd byte alignment then, at 306, a single byte is copied from the original to new image at the current image offsets, and both offsets are incremented by one in order to achieve even byte alignment and processing moves to step 308. If, at 304, the content of the original image offset is found to have even byte alignment then the decoder moves directly to step 308. At 308, the decoder sets the count of instructions relocated to zero.

At 310, the main processing loop for Phase I instruction relocation begins, and includes steps 312, 314 and 316 returning to step 310. This loop executes once for each instruction specified in the RELOCATE operation (i.e. a total of Ni times).

Step 310 tests whether all of the instructions specified by this RELOCATE operation have been processed. If no instructions remain that require processing for this RELOCATE operation, the decoder 154 moves to Phase II to begin relocation of data items. However, if the decoder 154 identifies that one or more instructions remain within this RELOCATE operation, the decoder moves to step 312 which begins the main instruction relocation loop to process a single instruction. If at 312, the instruction is not a transfer of control, step 314 copies the instruction from the original image to the new image. The original and new image offsets are incremented at 316 and the count of instructions relocated is incremented such that the process loop can begin again for the next instruction in the image at 310.

However, if the decoder 154 finds an instruction that is a transfer of control at 312, the decoder moves to step 318 to determine where the instruction used to go to in the original image (i.e. the destination address of a branch or jump) and, using the ATT 160, where the instruction needs to go in the new image due to this RELOCATE operation. At 320, a new 16-bit instruction is generated that reflects the new destination where the instruction needs to go within the new image. Step 322 places the new instruction generated into the proper location within the new (updated) image. The decoder is now ready to move onto the next instruction. At 316, the original and new image offsets are incremented together with the count of instructions relocated such that the process loop can begin again for the next instruction in the image at 310. The instruction relocation process continues at 310 by testing whether all of the instructions specified by this RELOCATE operation have been processed. If no instructions remain within this RELOCATE operation that require processing, the decoder 154 moves to Phase II to begin relocation of data items.

Referring now to FIG. 3B, the method required to decode and relocate data items from a RELOCATE operation read from the update package 124 is illustrated. The process of decoding data items begins after Phase I has completed relocating all instructions.

At 301, the decoder 154 tests whether any data items require relocation, if so processing moves to step 303 to determine if the data is 32-bit aligned in the original image (the data must be 32-bit aligned in the new image by virtue of the encoding method employed). If the data is not 32-bit aligned, step 303 moves to 305 where the original image offset (i.e. $S_{off}$) is incremented by two to provide 32-bit alignment. Next, at 307, the count of data items relocated is set to zero.

At 309, the main processing loop for Phase II data item relocation begins, and includes step 311 and 313, returning to step 309. This loop executes once for each data item specified in the RELOCATE operation (i.e. a total of Nd times). The decoder tests at 309 whether any data items specified in the current RELOCATE operation remain to be relocated, and if so processing moves to 311.

At 311, the 32-bit data value from the original image is treated as an address and used to find, via the ATT, a corresponding 32-bit data value for the new image. The new value is placed into the new (updated) image at the current new image offset, and the decoder moves to step 313. The original and new image offsets are incremented at 313 together with the count of data items relocated, and the decoder returns to step 309 to check whether further data items remain to be relocated. If, at 309, no further data items remain, processing moves to 315 where the persistent values of original and new image offsets are updated with those current at the end of the RELOCATE operation just decoded.

Finally the decoder 154 returns to read the next operation from the update package 124.

ENCODING EXAMPLE

This section provides a small, fully worked example of expressing the differences between two fragments of an original (source) and new (destination) image using the RELOCATE operation. The image fragments being described are shown below; these use the Thumb instruction set. It should be noted that this example is designed to show some of the methods described herein. The actual code is purely for example purposes to demonstrate some of the aspects of the RELOCATE encoding.

The first column shows the physical address (in hex) of the code/data, the second the representation of an instruction (in hex), and the third the instruction mnemonic. The '.data' directive is used here to indicate a 32-bit data item.

| Original Image | | | | New Image | | | |
|---|---|---|---|---|---|---|---|
| 00200004 | b500 | PUSH | {LR} | 00200256 | b500 | PUSH | {LR} |
| 00200006 | 1c0b | ADD | R3, R1, #0 | 00200258 | 1c0b | ADD | R3, R1, #0 |
| 00200008 | 2800 | CMP | R0, #0 | 0020025a | 2800 | CMP | R0, #0 |
| 0020000a | d101 | BNE | 00200010 | 0020025c | d101 | BNE | 00200262 |
| 0020000c | 2a06 | CMP | R2, #6 | 0020025e | 2a06 | CMP | R2, #6 |
| 0020000e | da01 | BGE | 00200014 | 00200260 | da01 | BGE | 00200266 |
| 00200010 | 2000 | MOV | R0, #0 | 00200262 | 2000 | MOV | R0, #0 |
| 00200012 | bd00 | POP | {PC} | 00200264 | bd00 | POP | {PC} |
| 00200014 | 2000 | MOV | R0, #0 | 00200266 | 2000 | MOV | R0, #0 |
| 00200016 | 1c1a | ADD | R2, R3, #0 | 00200268 | 1c1a | ADD | R2, R3, #0 |
| 00200018 | 4c03 | LDR | R4, [PC, #12] | 0020026a | 4c03 | LDR | R4, [PC, #12] |
| 0020001a | f000f80d | BL | 00200038 | 0020026c | f000f80c | BL | 00200288 |
| 0020001e | 2001 | MOV | R0, #1 | 00200270 | 2001 | MOV | R0, #1 |
| 00200020 | bd00 | POP | {PC} | 00200272 | bd00 | POP | {PC} |
| 00200022 | 46c0 | NOP | | | | | |
| 00200024 | | .data | 0x00336b24 | 00200274 | | .data | 0x00336fa4 |
| 00200028 | | .data | 0x0013716c | 00200278 | | .data | 0x0013726c |
| 0020002c | | .data | 0x00000701 | 0020027c | | .data | 0x00000701 |
| 00200030 | | .data | 0x00137170 | 00200280 | | .data | 0x00137270 |
| 00200034 | | .data | 0x0000930f | 00200284 | | .data | 0x0000930f |
| 00200038 | b510 | PUSH | {R4, LR} | 00200288 | b510 | PUSH | {R4, LR} |
| 0020003a | 4b96 | LDR | R3, [PC, #600] | 0020028a | 4b96 | LDR | R3, [PC, #600] |

-continued

| Original Image | | | | New Image | | | |
|---|---|---|---|---|---|---|---|
| 0020003c | 008c | LSL | R4, R1, #2 | 0020028c | 008c | LSL | R4, R1, #2 |
| 0020003e | 591c | LDR | R4, [R3, R4] | 0020028e | 591c | LDR | R4, [R3, R4] |
| 00200040 | 2300 | MOV | R3, #0 | 00200290 | 2300 | MOV | R3, #0 |
| 00200042 | 2c00 | CMP | R4, #0 | 00200292 | 2c00 | CMP | R4, #0 |
| 00200044 | d1e4 | BNE | 00200010 | 00200294 | d1e5 | BNE | 00200262 |
| 00200046 | 8fa0 | LDRH | R0, [R4, #60] | 00200296 | 8fa0 | LDRH | R0, [R4, #60] |
| 00200048 | 1c0b | ADD | R3, R1, #0 | 00200298 | 1d0b | ADD | R3, R1, #4 |
| 0020004a | 2b07 | CMP | R3, #7 | 0020004a | 2b07 | CMP | R3, #7 |

It is assumed in the following description that at the start of the processing of this fragment that the ATT contains the following entries. Whether this is by virtue of pre-loaded link map data, or hints added by RELOCATE processing already performed during the difference process is unimportant. Only entries that are directly relevant to the above fragment are shown:

| Address | Delta | Type | Committed |
|---|---|---|---|
| 0x00000000 | 0x0 | REQUIRED | YES |
| 0x00200000 | +0x252 | HINT | YES |
| 0x00330000 | +0x480 | HINT | YES |

The identification of RELOCATE operations for these fragments starts when the BDE submits a COPY operation with $S_{off}$=0x200004, $D_{off}$=0x200256, and $C_{len}$=25. This corresponds to a simple copy of the code fragment up to the point of the first difference in the binary data. The exact figures quoted here assume a big-endian CPU; changing to a little-endian CPU does not however change the detailed sequence of operations or the final result of the analysis.

Once the COPY has been submitted the following steps are taken (addresses mentioned are for the original image unless otherwise stated):

Phase I code relocation begins with $S_{off}$=0x200004, $D_{off}$=0x200256.

The threshold for the acceptable length of a RELOCATE at this offset is required. Where a COPY has been provided by the BDE this is trivially the same as its length, i.e. 25 bytes in this case.

The PUSH/ADD/CMP sequence at 0x200004 is trivially copied. None of these instructions is a transfer of control, and the binary representations are identical.

The BNE at 0x20000A requires an ATT address/delta entry of 0x200010/+0x252 (to translate the destination address of the modified instruction from 0x200010 to 0x200262); no entry exists in the ATT for this exact address, thus the new entry is added, type=REQUIRED, Committed=NO.

The CMP at 0x20000C is trivially copied.

The BGE at 0x20000E requires an ATT entry of 0x200014/+0x252; this is added to the ATT without conflict.

The MOV/POP/MOV/ADD sequence at 0x200010 is trivially copied.

The LDR at 0x200018 is trivially copied. It can also be used to correlate the address held in the image at its load destination. This falls at 0x200028 in the original image and 0x200278 in the new image. The 32-bit data items (assumed to be addresses) at these offsets are respectively 0x13716C and 0x13726C. A hint entry can be added to the ATT for this translation, i.e. 0x13716C/+0x100, type=HINT, Committed=NO.

The BL at 0x20001A requires an ATT entry of 0x200038/+0x250; this is added to the ATT without conflict. At this point, the binary content of the images differs. The final byte of the BL instruction marks the end of the COPY submitted by the BDE.

The MOV/POP sequence at 0x20001E is trivially copied.

The NOP at 0x200022 is compared to the 0x0033 (which is actually data) at 0x200274 in the new image. Since the NOP is not a transfer of control and the binary values differ, Phase I instruction relocation stops, having processed 14 instructions. The NOP is present in the original image to ensure that the following data items are 32-bit aligned. Since the code fragment has moved by an odd multiple of 16-bits, the NOP is not present in the new image.

Phase II data relocation begins with $S_{off}$=0x200022, $D_{off}$=0x200274. Since data relocation must start on a 32-bit aligned boundary, $S_{off}$ is advanced by 2 (in accordance with the additional notes previously presented, being note three referencing FIG. 2B, at step 201: specifically—Case 1). At this point the ATT has the following contents:

| Address | Delta | Type | Committed |
|---|---|---|---|
| 0x00000000 | 0x0 | REQUIRED | YES |
| 0x0013716C | +0x100 | HINT | NO |
| 0x00200000 | +0x252 | HINT | YES |
| 0x00200010 | +0x252 | REQUIRED | NO |
| 0x00200014 | +0x252 | REQUIRED | NO |
| 0x00200038 | +0x250 | REQUIRED | NO |
| 0x00330000 | +0x480 | HINT | YES |

The 32-bit data item at 0x200024 is compared to that at 0x200274 in the new image. The values, taken to be addresses, are 0x336B24 and 0x336FA4. To relocate this data item requires an ATT entry of 0x336B24/+0x480. This matches the existing translation that the ATT provides for this address, thus the new entry is added.

The 32-bit data item at 0x200028 is compared to that at 0x200278 in the new image. The values are 0x13716C and 0x13726C. To relocate this data item requires an ATT entry of 0x13716C/+0x100. There is already an ATT entry for this exact address and with a matching delta. However, the existing entry is of type HINT; this is changed to REQUIRED_HINT.

The following three data items from 0x20002C are handled in the same way. The ATT entries required are respectively 0x701/+0x0, 0x137170/+0x100 and 0x930F/+

0x0. These all match the applicable existing translations provided by the ATT for these addresses, thus the new entries are added.

The next data item at 0x200038 is compared to that at 0x200288 in the new image. The values at these offsets are both 0xB5104B96 and would require an ATT entry of 0xB5104B96/+0x0. This however conflicts with the existing ATT translation, which gives a delta of 0x480 for this address. Thus Phase II data relocation stops, having processed 5 data items. The ATT contents at this point are:

| Address | Delta | Type | Committed |
|---|---|---|---|
| 0x00000000 | 0x0 | REQUIRED | YES |
| 0x00000701 | 0x0 | REQUIRED | NO |
| 0x0000930F | 0x0 | REQUIRED | NO |
| 0x0013716C | +0x100 | REQUIRED_HINT | NO |
| 0x00137170 | +0x100 | REQUIRED | NO |
| 0x00200000 | +0x252 | HINT | YES |
| 0x00200010 | +0x252 | REQUIRED | NO |
| 0x00200014 | +0x252 | REQUIRED | NO |
| 0x00200038 | +0x250 | REQUIRED | NO |
| 0x00330000 | +0x480 | HINT | YES |
| 0x00336B24 | +0x480 | REQUIRED | NO |

The total length of the operation is (14*2)+(5*4), or 48 bytes. This is greater than the minimum threshold of 25 bytes; the RELOCATE is thus accepted for encoding in preference to the original COPY.

The ATT.commit( ) processing is performed and the appropriate encoding of RELOCATE(14, 5) is written to the update package. The ATT now has the following contents:

| Address | Delta | Type | Committed |
|---|---|---|---|
| 0x00000000 | 0x0 | REQUIRED | YES |
| 0x00000701 | 0x0 | REQUIRED | YES |
| 0x0000930F | 0x0 | REQUIRED | YES |
| 0x0013716C | +0x100 | REQUIRED | YES |
| 0x00137170 | +0x100 | REQUIRED | YES |
| 0x00200000 | +0x252 | HINT | YES |
| 0x00200010 | +0x252 | REQUIRED | YES |
| 0x00200014 | +0x252 | REQUIRED | YES |
| 0x00200038 | +0x250 | REQUIRED | YES |
| 0x00330000 | +0x480 | HINT | YES |
| 0x00336B24 | +0x480 | REQUIRED | YES |

Phase I instruction relocation starts with $S_{off}$=0x200038, $D_{off}$=0x200288.

A threshold for the acceptable length of a RELOCATE at these offsets is required. There is no BDE supplied COPY, thus the threshold is found by scanning ahead looking for the first difference in the binary content. It is found to be 13 bytes (the byte at 0x200045 differing from its equivalent in the new image).

The PUSH/LDR/LSL/LDR/MOV/CMP sequence at 0x200038 is trivially copied. The LDR at 0x20003A will cause a further HINT entry to be added to the ATT; for simplicity, this is not shown here and would require the destination address to be within the binary image being processed.

The BNE at 0x200044 requires an ATT entry of 0x200010/+0x252; this is an exact match for an existing REQUIRED entry, thus no ATT change is needed. At this point, the binary of the images differ. If an attempt were made to express the image region from 0x200038 with a COPY, the COPY would terminate on the first byte of the BNE instruction.

The LDRH at 0x200046 is trivially copied.

The ADD at 0x200048 is compared to the ADD at 0x200298 in the new image. Since these do not match and are not transfers of control Phase I instruction relocation stops, having processed 8 instructions.

Phase II data relocation is attempted on the same data. Taken as addresses, the 32-bit values at these offsets are 0x1C0B2B07 and 0x1D0B2B07, which require an ATT entry of 0x1C0B2B07/+0x100000; however, this conflicts with the existing translation of +0x480 for this address. This forces Phase II data relocation to stop without relocating any data items.

This RELOCATE has processed 8 instructions and 0 data items. The total length of the operation is thus (8*2)+ (0*4), or 16 bytes. This is greater than the minimum threshold of 13 bytes; the RELOCATE is thus accepted for encoding.

The ATT.commit( ) processing is performed; however, no changes have been made to the ATT to support this RELOCATE and thus its state remains as previously shown.

The appropriate encoding of RELOCATE (8, 0) is written to the update package.

Phase I processing resumes at 0x200048. However, this is known to fail, as must the ensuing Phase II. Since neither instructions nor data have been relocated, the RELOCATE processing returns to the BDE with updated offsets of $S_{off}$=0x200048, $D_{off}$=0x200298.

The final ATT is unchanged from its previous state.

The BDE is likely to express the byte at 0x200048 by an ADD operation, and then resume with a COPY at 0x200049 (unless a COPY can be found from elsewhere in the images for the new content at 0x2000298). These subsequent COPYs will in turn be presented back to the update encoder for possible re-encoding as RELOCATE operations.

The version of the ATT finally written to the update package can be greatly simplified. First, all HINT entries are removed, then entries with repeated delta values are removed, and the type/committed information is discarded, leaving only the following data applicable to these code fragments:

| Address | Delta |
|---|---|
| 0x00000000 | 0x0 |
| 0x0013716C | +0x100 |
| 0x00200010 | +0x252 |
| 0x00200038 | +0x250 |
| 0x00336B24 | +0x480 |

The final encoding in the update package of these code fragments is, therefore (the final ADD and any subsequent operations being highly dependent on data elsewhere in the image, relative efficiency of COPY encodings etc.):

| | |
|---|---|
| RELOCATE | 14, 5 |
| RELOCATE | 8, 0 |
| ADD | 1 { . . . } |

Providing an equivalent encoding without using RELOCATE is difficult since the result is critically dependent on the relative efficiency of short COPY encodings and the availability of matching data elsewhere in the images. However, in this example 70-byte sequence, 7 non-contiguous byte values change, and 2 bytes are removed; expressing this would be likely to require a significant number of operations. Simplistically, using only data available in the code fragments shown this might result in the following sequence just to replace the 2 RELOCATEs above (using notation from U.S. patent application Ser. No. 10/676,483 entitled "Efficient System and Method for Updating a Memory Device"):

```
COPYADD         25, 1, { ... }
COPY            4
SETCOPYOFFSET   +2
COPYADD         2, 2, { ... }
COPYADD         2, 1, { ... }
COPYADD         7, 1, { ... }
COPYADD         18, 1, { ... }
COPY            2
```

Other embodiments of the invention will be apparent to the skilled in the art from a consideration of this specification or practice of the invention disclosed herein. All publications cited in this specification are incorporated by reference. It is intended that the specification and examples be considered as exemplary only, with the true scope and spirit of the invention being indicated by the following claims.

What is claimed is:

1. A method for convening an original image into a new image, said method implemented in a computing device and comprising:
   a. Determining differences between the original image and the new image by a binary comparison thereof;
   b. Expressing the differences between the original image and the new image as an instruction set comprising at least one candidate COPY operation;
   c. Re-expressing each candidate COPY operation as a RELOCATE operation, wherein each said RELOCATE operation comprises two operands whereby a first operand expresses a number of instructions to be relocated and a second operand expresses a number of data values to be relocated;
   d. Replacing in the instruction set each candidate COPY operation with at least one corresponding RELOCATE operation if each corresponding RELOCATE operation's total length progresses further through the original and new images than a corresponding COPY operation;
   e. Populating an address translation table which comprises a sorted list of original image addresses where each original image address is related to an associated delta value, wherein the corresponding image addresses in the new image are found by adding said associated delta value to each original image address of the sorted list of original image addresses; and
   f. Encoding an update package to include (i) the instruction set comprised of a plurality of COPY and RELOCATE operations and (ii) the address translation table.

2. The method of claim 1 whereby said update package is decoded and applied to the original image to create the new image.

3. The method of claim 1, wherein said re-expressing comprises analysis of the original image and new image and/or of information from link maps yielding detailed information relating which pans of the original image we actually code and which are data.

4. The method of claim 1, wherein encoding a COPY operation is followed by encoding one or more RELOCATE operations into the update package.

5. The method of claim 1, wherein encoding a plurality of consecutive RELOCATE operations are grouped between BEGIN/ENDRELOCATE operation pairs.

6. The method of claim 1, wherein said populating comprises pre-loading the address translation table with an outline of code/data movement, using original firmware symbolic information, by matching symbols between link maps for the original image and new image, deriving an associated delta from the differences in their addresses, and associating relocation type HINT for each pre-loaded entry.

7. The method of claim 1, wherein said populating adds relocation HINTS to address translation table entries further comprises:
   a. Identifying commonly occurring compiler-generated 'switch' constructs;
   b. Matching 'switch' constructs from the original image and new image's jump tables;
   c. Examining the original image and new image's jump tables ensuring same size;
   d. Extracting associated code entry points from their jump tables;
   e. Generating new address translation table entries, one for each entry in the new image's jump table; and
   f. Associating relocation type HINT for each new address translation table entry.

8. The method of claim 1, wherein said populating pre-loads address translation table entries relating movement of data areas within the original image and new image further comprises:
   a. Identifying commonly occurring load register instructions where the value being loaded is itself an address;
   b. Matching identical load register instructions from the original image and new image;
   c. Calculating the address being loaded in the original image and new image and determining that they both fall within their corresponding images;
   d. Determining a 32-bit value of a data item at a location representing corresponding addresses within the original image and new image;
   e. Generating a new address translation table entry, for each corresponding address; and
   f. Associating relocation type HINT for the new address translation table entry.

9. The method of claim 1, wherein said encoding the address translation table employs compressing the contents further comprises:
   a. Discarding address/delta pairs of type HINT;
   b. Removing consecutive entries having the same deltas except for the first entry in each sequence;
   c. Splitting the address translation table into two equal length lists, one containing addresses, and the other containing corresponding deltas;
   d. Expressing each list as a list of difference values where each value is the difference between two consecutive entries in an original list;
   e. Shifting all resulting values 1-bit to the right;
   f. Encoding values in resulting lists using variable length encoding, including a leading zero byte on values where an original value was odd; and
   g. Writing the two equal length lists into the update package using a standard compression library.

10. The method of claim 1, wherein said populating employs multiple pass differencing further comprises:
  a. Discarding the update package generated after a first run of a BDE;
  b. Retaining contents of the address translation table constructed during a first differencing pass as a pre-populated form;
  c. Modifying retained address translation table entries of type REQUIRED to type HINT;
  d. Processing the same original image and new image using a second differencing pass; and
  e. Adding entries to the address translation table during the second differencing pass.

11. A method of updating an original image to create a new image, said method implemented in a computing device and comprising:
  a. Generating an update package by comparing the original image and the new image and using result of said comparison to encode an instruction set comprised of:
    i. A plurality of operations, including at least one RELOCATE operation comprising two operands whereby a first operand expresses a number of instructions to be relocated and a second operand expresses a number of data values to be relocated, and
    ii. An address translation table comprising a sorted list of original image addresses where each original image address is related to an associated delta value, wherein the corresponding image addresses in the new image are found by adding associated delta values to each original image address of the sorted list of original image addresses; and
  b. Applying the update package by interpreting the instruction set to direct the updating of the original image to create the new image in an order specified by the plurality of operations and associated address translation table data values.

12. The method of claim 11, wherein said applying further comprises:
  a. Extracting the address translation table from the update package;
  b. Processing each operation contained within the update package in sequential order; and
  c. Decoding each RELOCATE operation according to addresses/delta information read from the address translation table data values.

13. The method of claim 12, wherein said decoding of each RELOCATE operation further comprises:
  a. Copying instructions from the original image to new image, relocating any transfers of control found within those copied according to the addresses/delta information read from the address translation table data values; and
  b. Copying data from original image to new image relocating each item according to the addresses/delta information read from the address translation table data values.

14. A method for updating an original image into a new image, said method implemented in a computing device and comprising:
  a. Generating an instruction set including one or more RELOCATE operations, wherein each RELOCATE operation performs a COPY operation of the same length as a complete RELOCATE operation, and each RELOCATE operation comprises two operands whereby a first operand expresses a number of instructions to be relocated and a second operand expresses a number of data values to be relocated;
  b. Populating an address translation table with a sorted list of original image addresses where each original image address is related to an associated delta value, whereby each original image address relates to the original image and a corresponding new image address is found by adding one associated delta value to an original image address of the sorted list of original image addresses; and
  c. Encoding to create an update package comprising the instruction set and the address translation table.

* * * * *